(12) United States Patent
Kara et al.

(10) Patent No.: US 12,048,407 B2
(45) Date of Patent: Jul. 30, 2024

(54) HOUSEHOLD APPLIANCE, IN PARTICULAR DISHWASHER

(71) Applicant: Miele & Cie. KG, Guetersloh (DE)

(72) Inventors: Seyfettin Kara, Spenge (DE); Eckard Riedenklau, Bielefeld (DE)

(73) Assignee: MIELE & CIE. KG, Guetersloh (DE)

( * ) Notice: Subject to any disclaimer, the term of this patent is extended or adjusted under 35 U.S.C. 154(b) by 427 days.

(21) Appl. No.: 17/420,686

(22) PCT Filed: Jan. 6, 2020

(86) PCT No.: PCT/EP2020/050117
§ 371 (c)(1),
(2) Date: Jul. 5, 2021

(87) PCT Pub. No.: WO2020/144128
PCT Pub. Date: Jul. 16, 2020

(65) Prior Publication Data
US 2022/0095883 A1    Mar. 31, 2022

(30) Foreign Application Priority Data

Jan. 7, 2019 (DE) ..................... 10 2019 100 190.0

(51) Int. Cl.
*A47L 15/42* (2006.01)
*A47L 15/00* (2006.01)
(Continued)

(52) U.S. Cl.
CPC ....... *A47L 15/4295* (2013.01); *A47L 15/0063* (2013.01); *A47L 15/4257* (2013.01);
(Continued)

(58) Field of Classification Search
None
See application file for complete search history.

(56) References Cited

U.S. PATENT DOCUMENTS 10,080,477 B2    9/2018    Fauth et al.
2011/0268311 A1  11/2011   Hudnut et al.
(Continued)

FOREIGN PATENT DOCUMENTS

CN    107411672 A    12/2017
DE    10048081 A1    4/2002
(Continued)

OTHER PUBLICATIONS

DE 10048081 A1 translation, Determining Loading and Degree of Soiling of Dishwashing Machine Contents, Employs One or More Image Recognition Systems, Bertram (Year: 2002).*
(Continued)

*Primary Examiner* — Cristi J Tate-Sims
(74) *Attorney, Agent, or Firm* — LEYDIG, VOIT & MAYER, LTD.

(57) ABSTRACT

A household appliance includes: a treatment container having a treatment compartment and a loading opening for loading items to be treated; a treatment compartment door by which the loading opening is closeable; and a camera for visually detecting the treatment compartment. An area of the treatment compartment detectable by the camera is adjustable.

12 Claims, 14 Drawing Sheets

(51) Int. Cl.
   *G03B 17/17* (2021.01)
   *G03B 17/56* (2021.01)
(52) U.S. Cl.
   CPC ........... *G03B 17/17* (2013.01); *G03B 17/561* (2013.01); *A47L 2401/04* (2013.01)

(56) References Cited

U.S. PATENT DOCUMENTS

2017/0188416 A1* 6/2017 Beifuss ................ H05B 6/6447
2017/0202426 A1* 7/2017 Bosen .................... A47L 15/23
2018/0214001 A1  8/2018 Wöbkemeier

FOREIGN PATENT DOCUMENTS

| DE | 102009023252 A1 | 12/2010 |
| DE | 102013206405 A1 | 11/2013 |
| DE | 102013114230 A1 | 6/2015 |
| DE | 102014215660 A1 | 1/2016 |
| EP | 3205764 A1 | 8/2017 |
| KR | 20060100620 A | 9/2006 |
| WO | WO 2009138359 A1 | 11/2009 |
| WO | WO 2017032629 A1 | 3/2017 |

OTHER PUBLICATIONS

CN 109008877 A translation, A Dishwasher and Its Working Method, Fan (Year: 2018).*

* cited by examiner

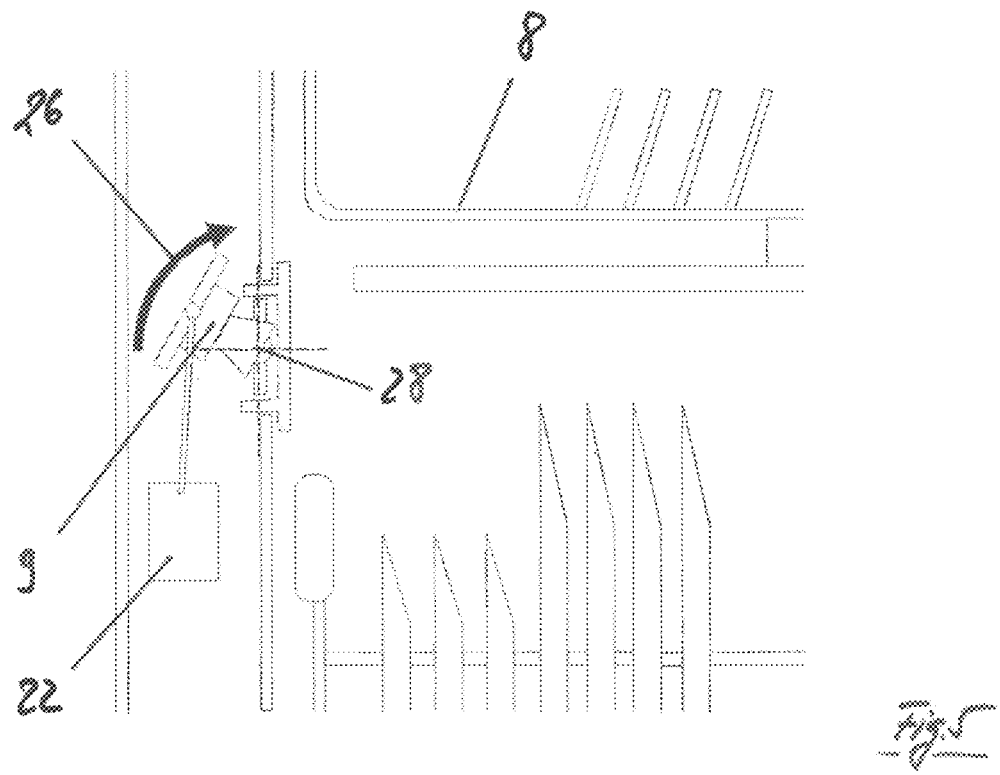
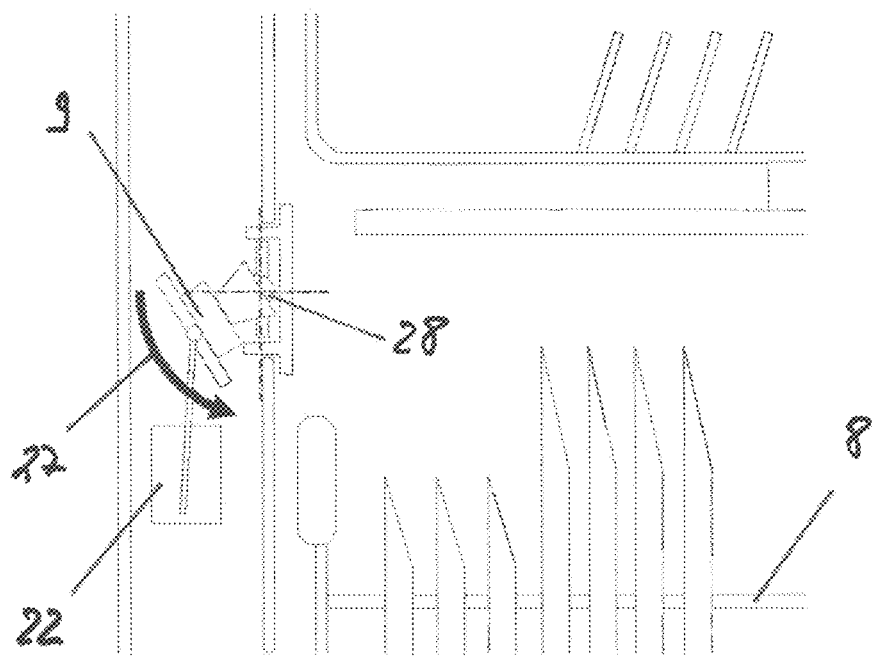
Fig. 6

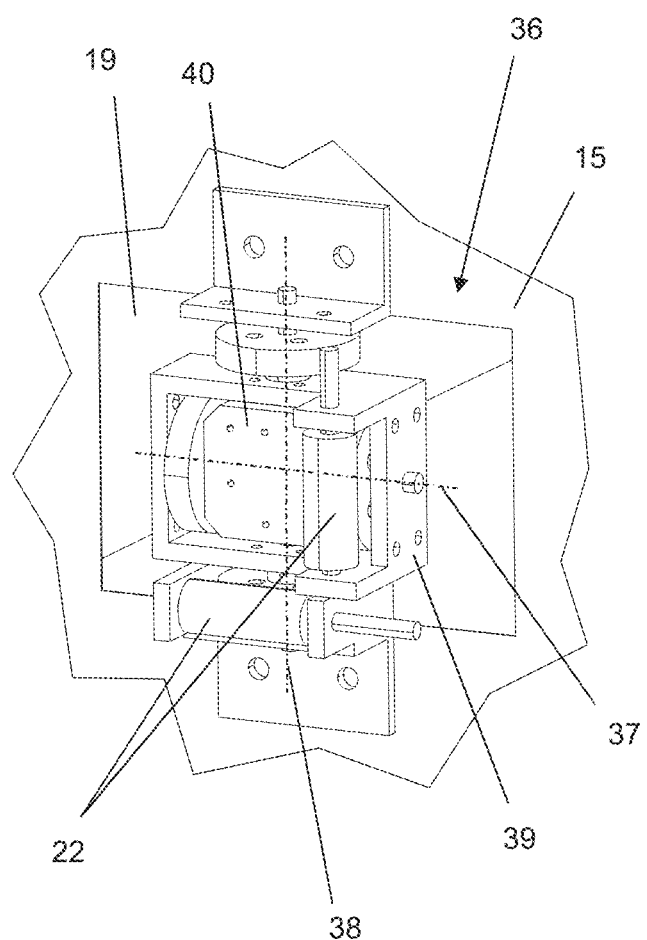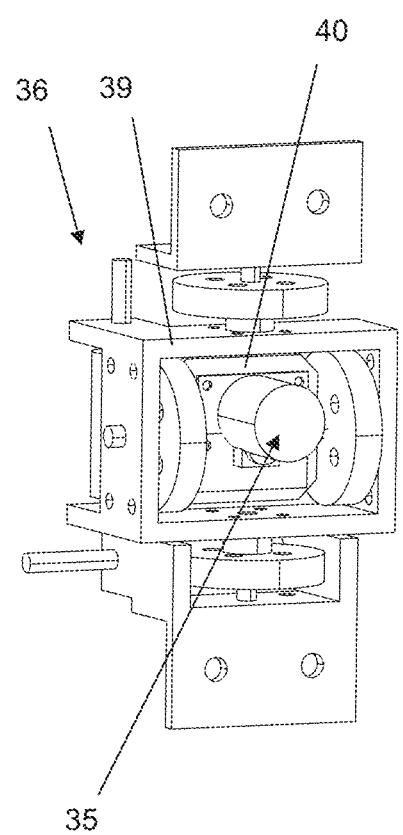
Fig. 9
Fig. 10

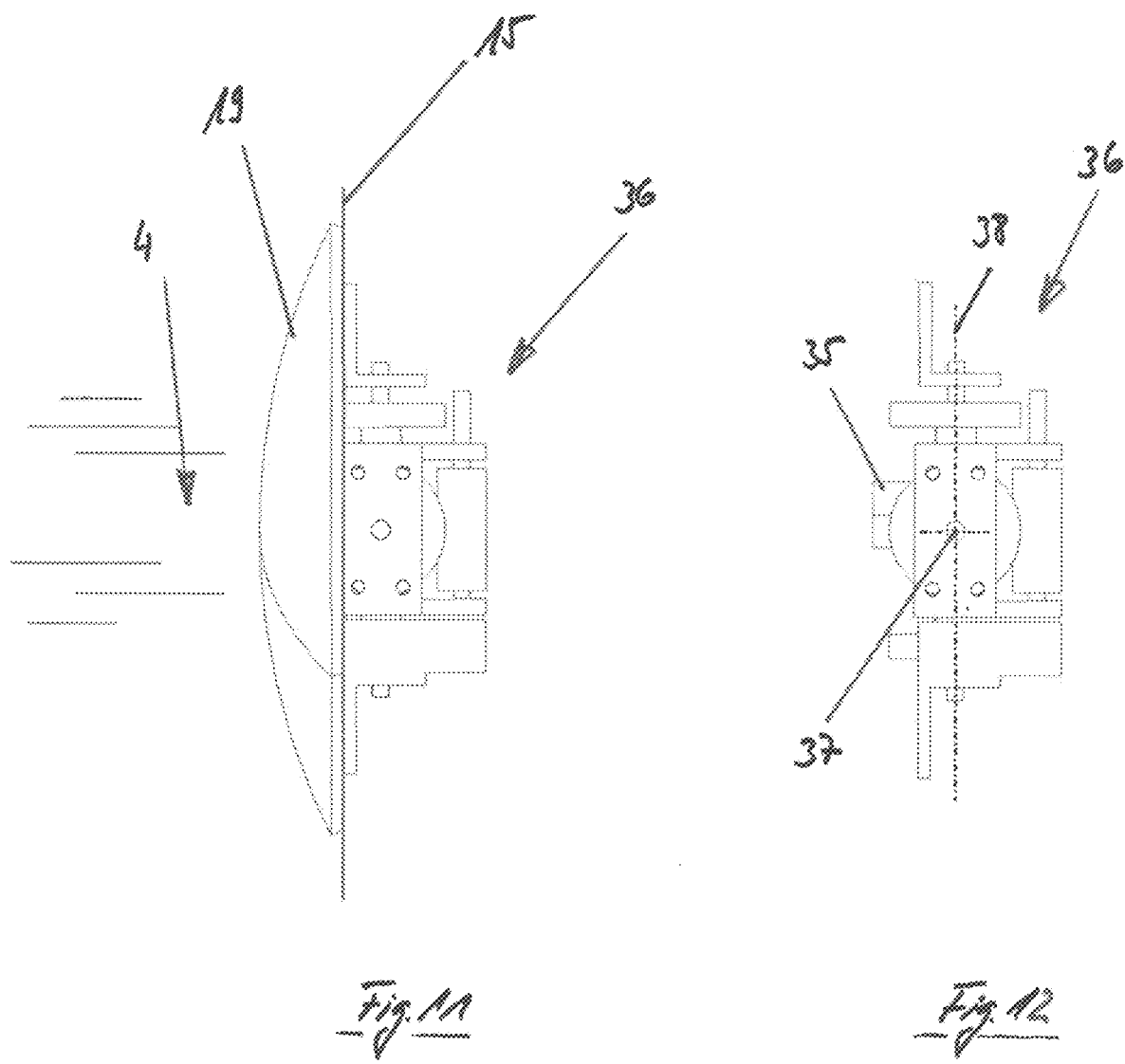

54

HOUSEHOLD APPLIANCE, IN PARTICULAR DISHWASHER

CROSS-REFERENCE TO PRIOR APPLICATIONS

This application is a U.S. National Phase application under 35 U.S.C. § 371 of International Application No. PCT/EP2020/050117, filed on Jan. 6, 2020, and claims benefit to German Patent Application No. DE 10 2019 100 190.0, filed on Jan. 7, 2019. The International Application was published in German on Jul. 16, 2020 as WO 2020/144128 under PCT Article 21(2).

FIELD

The invention relates to a household appliance, in particular a dishwasher, for example a domestic dishwasher, having a treatment container which provides a treatment compartment and has a loading opening for loading items to be treated, having a treatment compartment door with which the loading opening can be closed, and having a camera which is used to visually detect the treatment compartment.

BACKGROUND

Dishwashers of the generic type are well known per se from the prior art, for example from EP 3 205 764 A1.

A dishwasher of the typical design has a washing container which provides a washing compartment. The latter is accessible by the user via a loading opening which can be closed in a fluid-tight manner by means of a pivotably mounted washing compartment door. In the intended use case, the washing container is used to receive items to be washed, which can be dishes, cutlery items and/or the like, for example.

For loading a dishwasher with items to be washed, a washing rack is generally used, which can be moved through the loading opening, specifically either into or out of the washing compartment, depending on the direction of movement. Depending on the design, a dishwasher typically has two or three washing racks. As a rule, the washing racks are designed as washing baskets, wherein a lower basket, an upper basket arranged above it in the height direction of the dishwasher, and optionally a cutlery drawer arranged above the upper basket in the height direction are provided.

EP 3 205 764 A1 mentioned at the outset discloses a generic dishwasher which has two cleaning cameras arranged in the washing compartment. These cameras are used for dirt detection of items to be washed which are arranged in washing baskets.

The use of a camera for loading detection is also known from the prior art. For example, WO 2017/032629 A1 discloses a generic dishwasher which has a camera unit arranged in the washing container. This camera unit is used to detect the loading of the washing baskets with items to be washed.

Although the previously known designs have proven successful in everyday practical use, there is a need for improvement. It has been shown that complete detection of the washing compartment by cameras provided for this purpose is not reliably ensured, whether for the purpose of dirt detection or loading detection. In this context, it is particularly problematic that the detection area of a camera can be blocked by an individual loading of a washing rack by a user. The visual detection of the washing compartment by the camera for loading detection and/or dirt detection is then possible only to an insufficient extent so that no individual adaptation of the cleaning program to be carried out to a detected loading and/or soiling can take place. As a result, in order to ensure a desirably achievable cleaning result, a comprehensive cleaning program is to be carried out, which may result in increased water and/or energy consumption in view of the cleaning task actually to be accomplished but not detected.

In order to account for the above problem, it is known from the prior art to use a plurality of cameras, for example from the aforementioned EP 3 205 764 A1, which proposes the use of two cleaning cameras arranged in the washing compartment. However, such an embodiment is disadvantageously complicated and expensive and, moreover, cannot ensure that the washing compartment is completely detected, in particular in the case of an individual loading of the washing racks by the user, which blocks either the detection area of the one or the other camera or even the detection area of both cameras in equal measure.

SUMMARY

In an embodiment, the present invention provides a household appliance, comprising: a treatment container comprising a treatment compartment and a loading opening for loading items to be treated; a treatment compartment door by which the loading opening is closeable; and a camera configured to visually detect the treatment compartment, wherein an area of the treatment compartment detectable by the camera is adjustable.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 5 shows a schematic sectional view of an embodiment according to the invention in accordance with a first camera position;

FIG. 6 shows a schematic sectional view of an embodiment according to the invention in accordance with a second camera position;

FIG. 9 shows a first perspective view of a pivot device according to the invention;

FIG. 10 shows a second perspective view of the pivot device according to FIG. 9;

FIG. 11 shows a schematic side view of the pivot device according to FIGS. 9 and 10 with a disk as a cover;

FIG. 12 shows the pivot device according to FIG. 11 without a cover;

DETAILED DESCRIPTION

Figure 1:
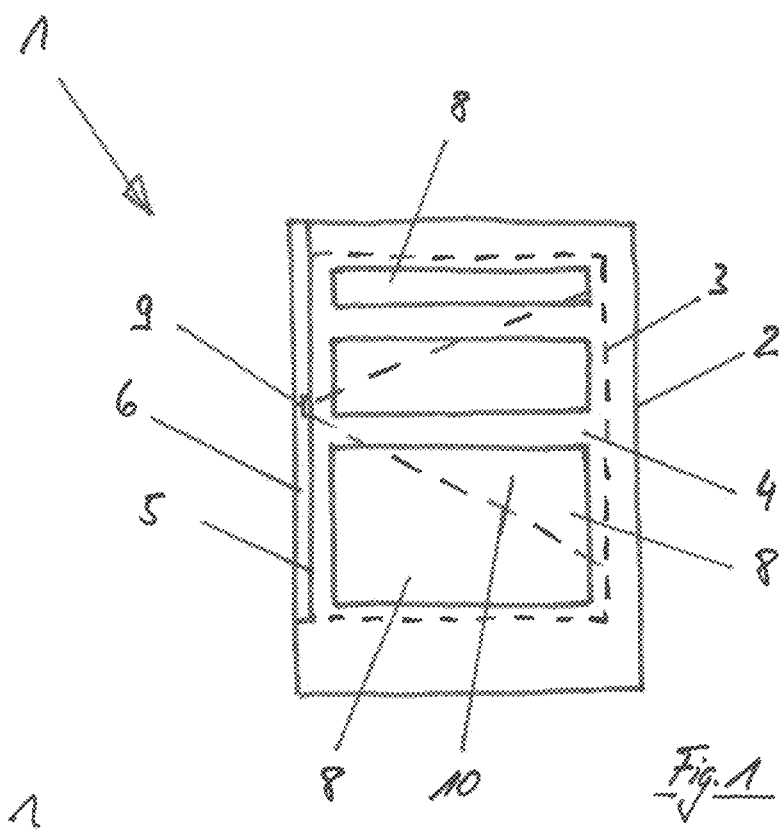
FIG. 1 is a purely schematic side view of a dishwasher according to the invention as an example of a household appliance according to the invention.

In an embodiment, the present invention provides a household appliance of the type mentioned at the outset in such a way that as complete a visual detection of the treatment compartment as possible is permitted even in the case of an individual loading of the treatment racks by the user.

In an embodiment, the present invention provides a household appliance which is characterized in that the area of the treatment chamber that can be detected by the camera can be adjusted.

In a departure from the prior art, it is proposed with the invention to provide a variable and thus adjustable detection area of the camera instead of an invariable camera viewing direction. This advantageously allows different viewing directions of the camera to be adjusted so that optionally different areas of the treatment compartment or the washing compartment can be detected. This is in particular advantageous for two reasons. On the one hand, with only one camera, the individual treatment or washing racks can be detected separately from one another. In this respect, it is possible to visually detect the individual treatment racks or washing baskets sequentially by corresponding adjustment of the viewing direction of the camera. On the other hand, in the case of an individual loading of one of the treatment or washing racks by the user, the viewing direction of the camera can be adapted such that an undesired obstruction of the camera detection area is avoided.

The design according to the invention of the adjustable detection area of the camera makes it possible, as a result, to be able to visually detect the washing compartment in its entirety, specifically independently of an individual loading, by the user, of the treatment or washing racks accommodated by the treatment compartment or washing compartment. This is done with only one camera, which keeps the overall design simple and cost-effective.

The invention has particular advantages for a dishwasher. Thus, proposed is in particular a dishwasher, such as a household dishwasher, having a washing container which provides a washing compartment and has a loading opening for loading with items to be washed, having a washing compartment door by means of which the loading opening can be closed, in particular in a fluid-tight manner, and having a camera which is used to visually detect the washing compartment, wherein the area of the washing compartment that can be detected by the camera is adjustable. The invention is described below for the example of a dishwasher. However, according to the invention, the described features can also be implemented in other household appliances.

Two alternatives for adjusting, i.e., variably adapting, the area detected by the camera are proposed with the invention. In a first alternative, the camera is mounted so as to be displaceable and/or pivotable. In a second alternative, the camera interacts with an optical device, wherein the optical device is mounted so as to be displaceable and/or pivotable. The result of both embodiment alternatives is that the area of the washing compartment that can be detected by the camera can be variably adapted, i.e., adjusted.

In the first alternative, the camera is mounted so as to be displaceable and/or pivotable. The camera is then mounted so as to be translationally movable and/or pivotable, wherein a pivoting of the camera about two perpendicular rotational axes may also be provided. As a result, the camera can be moved flexibly, in particular in any desired viewing direction, so that a visual detection of the entire washing container interior is possible.

According to a further feature of the invention, the camera is designed as part of a camera unit, wherein the camera unit is mounted so as to be displaceable and/or pivotable. In this preferred embodiment, not only the camera but also the camera unit containing the camera is correspondingly mounted so as to be displaceable and/or pivotable.

According to a further feature of the invention, the camera unit has a housing in which the camera is arranged. The camera is designed as a camera chip, for example.

The housing of the camera unit preferably also accommodates an optical system interacting with the camera. In this case, the optical system serves in particular to achieve an optimized design for the visual detection of the washing compartment. In particular, it is desirable to allow image acquisition which is as sharp as possible even across the depth of the washing compartment.

According to a further feature of the invention, the camera unit preferably has lighting means, for example in the form of LEDs. In the intended use case, the lighting means are used to illuminate the washing compartment, which improves a visual detection thereof. This embodiment of the invention dispenses with lighting means to be arranged separately in the washing compartment.

The provision of a camera unit, which is mounted so as to be displaceable and/or pivotable, has the advantage that, in the event of a displacement and/or pivoting, not only the camera but also the associated optical system and the lighting means provided under certain circumstances are also displaced and/or pivoted. This ensures an always optimized image acquisition.

An optical device interacting with the camera or the camera unit is provided in accordance with the above-mentioned second embodiment alternative of the invention. In this case, not the camera or the camera unit but the optical device is mounted so as to be displaceable and/or pivotable.

In this embodiment, the detection area of the camera is thus adjusted not by displacing or pivoting the camera or the camera unit but by the optical device causing an adjustment of the detection area of the camera or camera unit in that the optical device is displaced and/or pivoted. The advantage of this design is that the camera or the camera unit is of fixed design.

The optical device provides a reflective surface according to a further feature of the invention. In the simplest case, the optical device is formed by a mirror which causes a deflection of the viewing direction of the camera or camera unit. An adjustment of the position of the mirror then also leads to a changed viewing direction of the camera or camera unit, with the result that the detection area of the camera or camera unit is adjusted.

According to a further feature of the invention, a drive for the camera, the camera unit and/or the optical device is provided. Accordingly, a displacement and/or pivoting movement of the camera, the camera unit or the optical device takes place by means of a corresponding drive, which permits automation of the displacement and/or pivoting movement as a function of predefinable parameters.

In a first embodiment, the drive has a thermocouple. This thermocouple is, for example, one that expands or contracts as a function of the temperature of the washing liquor circulated in the washing compartment. Accordingly, a displacement and/or pivoting movement of the camera, the camera unit and/or the optical device results.

In an alternative and preferred embodiment, the drive has an electric motor. In this case, the electric motor permits a displacement and/or pivoting movement of the camera, the camera unit and/or the optical device to be carried out optionally or by a control unit as a function of predefinable parameters.

According to a further feature of the invention, it is provided that the camera, the camera unit and/or the optical device are arranged within a cavity provided by the washing compartment door. A fluid-tight accommodation within the washing compartment door is thus ensured. For visual detection of the washing compartment, the inner door panel of the washing compartment door is equipped with a corresponding aperture which is closed in a fluid-tight manner by means of a cover, for example a disk made of glass or plastic. In the intended use case, a visual detection of the washing compartment takes place through this aperture by means of the camera or the camera unit.

According to a further feature of the invention, a pivot device is provided which carries the camera or the camera unit and by means of which the camera or the camera unit can be pivoted, preferably about two perpendicular rotational axes. For example, it can be provided that when the washing compartment door is closed, a pivoting movement of the camera or the camera unit about a vertically oriented pivot axis, on the one hand, and about a horizontally oriented pivot axis, on the other hand, can take place. Complete detection of the washing compartment is possible in the superimposition of both pivoting and/or rotating movements.

A further feature of the invention provides that the displacement and/or pivoting movement of the camera or the camera unit can be controlled remotely. For this purpose, an operating or control unit is provided which has a radio connection with an operating device used by a user. The operating device can be, for example, a mobile receiving device, such as a tablet computer. Thereon, the image of the washing compartment captured by the camera or the camera unit can be displayed and an operation of the camera or the camera unit for the purpose of moving and/or pivoting the same can take place.

According to a further feature of the invention, a closure element is provided which can be transferred from a closed position covering the camera or the camera unit into a use position exposing the camera or the camera unit and vice versa.

The closure element provides essentially two advantages. When the washing compartment door is closed, the closure element is in the use position in which the camera or the camera unit is exposed. In this position of the closure element, visual detection of the washing compartment interior by the camera or the camera unit can take place in the intended use case. When the washing compartment door is open, i.e., when the dishwasher can be loaded by a user, the closure element is in its closed position, in which the camera or the camera unit is covered. As a result, soiling of the camera or of the camera unit or of the associated optical system by food residues, impurities and/or other solids or liquids falling and/or flowing is reliably avoided when the washing compartment is loaded with items to be washed. In addition, in the closed position of the closure element, mechanical safety against falling items to be washed is provided for the camera or the camera unit.

The closure element has a further advantage. Image acquisition by the camera or the camera unit when the washing compartment door is open is ruled out when a closure element is in the closed position. Thus, neither the surroundings of the dishwasher nor a user of the dishwasher can be detected by the camera or the camera unit, which is advantageous in particular for data or data protection reasons.

The overall result of the closure element is therefore that an intended image acquisition of only the washing compartment can take place. In addition, protection against soiling and protection from mechanical stress caused by inadvertently falling items to be washed are provided with regard to the camera or the camera unit.

According to a further feature of the invention, the dishwasher is characterized by means which cause the closure element to be transferred from the closed position into the use position and vice versa as a function of the position of the washing compartment door. A manual intervention for transferring the closure element from one position into the other position or vice versa is not required in this embodiment. Rather, an automatic movement of the closure element takes place, specifically preferably as a function of the position of the washing compartment door, which is caused by means provided accordingly for this purpose. These means can be, for example, a cable pull arrangement which acts on the closure element as a function of the opening angle of the washing compartment door. Alternatively, a lever arrangement having a counterweight can also be provided, which causes a movement of the closure element when the washing compartment door is pivoted due to gravity.

Overall, the invention proposes a design which allows the viewing direction of the camera or camera unit and thus the detection area of the camera or camera unit to be changed by either changing the position and orientation of the camera or camera unit or by changing the position and orientation of an optical device interacting with the camera or the camera unit. This allows the entire washing compartment to be detected visually, wherein it is also possible to adapt the viewing direction of the camera or the camera unit as a function of an individual loading of the washing compartment by the user with items to be washed.

FIG. 1 shows a dishwasher 1 according to the invention in a purely schematic side view.

The dishwasher 1 has a housing 2 which accommodates, inter alia, a washing container 3. The washing container 3 in turn provides a washing compartment 4 which, in the intended use case, serves to accommodate items to be washed 7.

In the embodiment shown, washing racks 8 serve to accommodate the items to be washed 7, specifically in the design as washing baskets, wherein a lower basket, an upper basket, and a cutlery drawer are provided.

The washing compartment 4 is accessible by a user through a loading opening 5. The loading opening 5 can be closed in a fluid-tight manner by means of a washing compartment door 6, wherein the washing compartment door 6 can be pivoted about a horizontally running pivot axis and can be transferred by a user from the closed position shown in FIG. 1 to an open position and vice versa.

The dishwasher 1 furthermore has a camera 9, which is provided by the washing compartment door 5 in accordance with the exemplary embodiments shown. The camera 9 is used for the visual detection of the washing compartment 4, wherein, as shown in FIG. 1, it detects the area 10 which covers a partial area of the washing compartment 4. As the exemplary illustration in FIG. 1 shows in this connection, the detection area 10 covers the lower washing rack 8, i.e., the lower basket, only partially and covers the washing rack 8 arranged at the top, i.e., the cutlery drawer, not at all.

Figure 2:
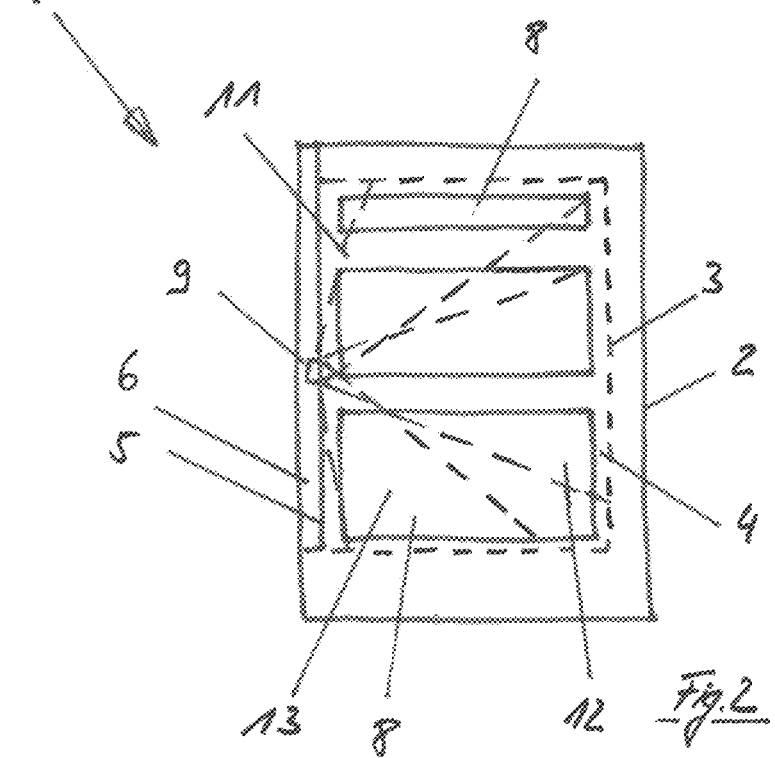
FIG. 2 shows the dishwasher according to FIG. 1, wherein different detection areas are shown.

According to the invention, it is therefore provided that the detection area 10 of the camera 9 is adjustable. This is shown in FIG. 2. It can be seen here that the detection area 10 of the camera 9 according to FIG. 1 can be changed so that the detection areas 11, 12, and 13 shown by way of example in FIG. 2 result, which also partially overlap. In sum, the detection areas 11, 12, and 13 preferably cover the washing compartment 4 completely, but at least approximately completely, so that all washing racks 8 can be detected visually in equal measure, which advantageously, inter alia, permits a meaningful soiling and/or loading detection.

Two alternatives are proposed with the invention for adjusting the detection area 10 of the camera 9. According to a first solution proposal, the camera 9 is mounted so as to be displaceable and/or pivotable. Accordingly, the viewing direction of the camera 9 for adjusting the detection area 10 can be adjusted by displacing and/or moving the camera 9. Alternatively, an optical device interacting with the camera 9 can be provided, which in turn is mounted so as to be displaceable and/or pivotable. Accordingly, a camera 9 fixed per se is used, wherein the viewing direction of the camera 9 can be varied by displacing and/or pivoting the optical device, which leads to an adjustment of the detection area 10 as a result. The further FIGS. 3 to 21 show different embodiments in detail.

Figure 3:
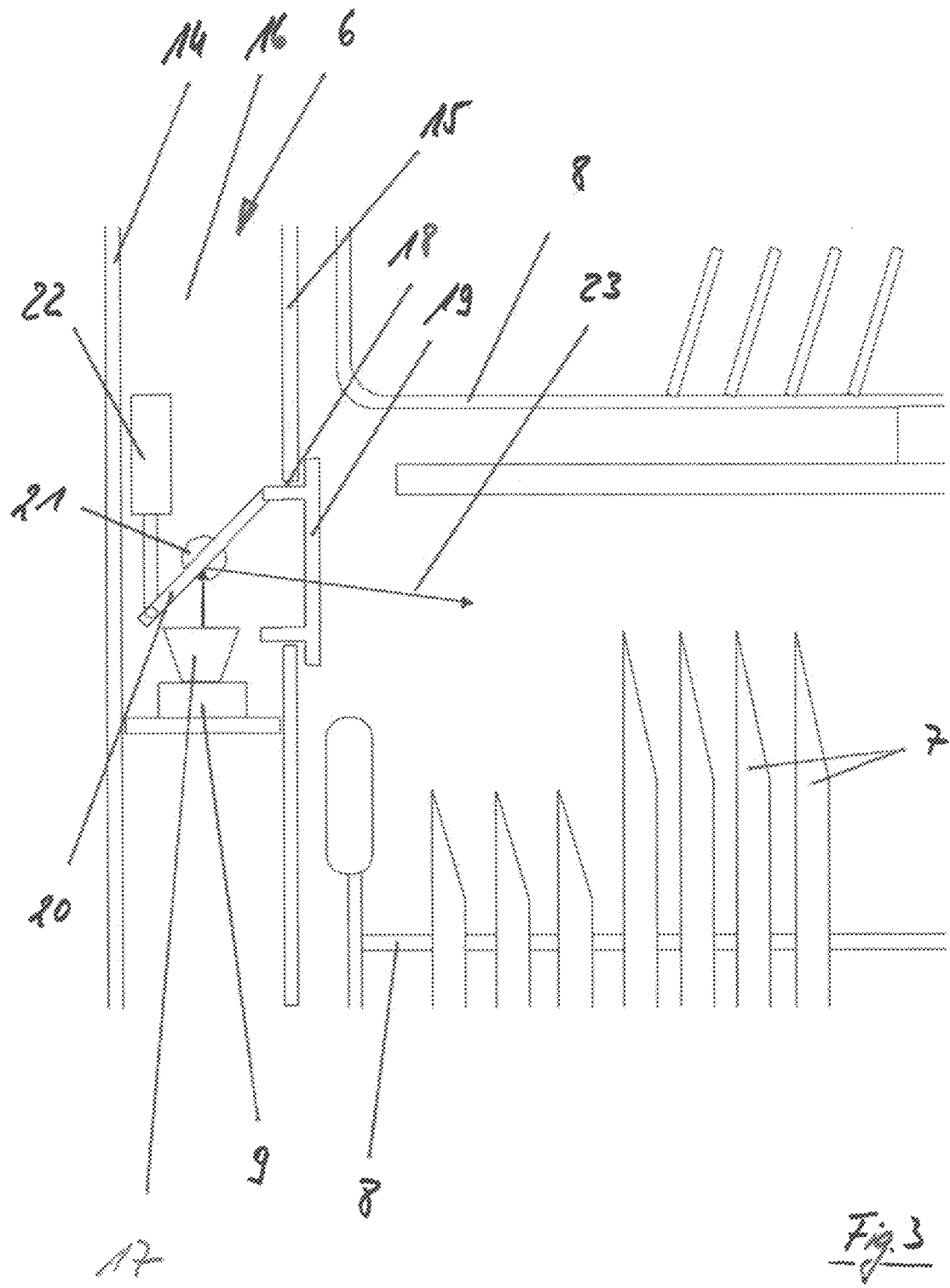
FIG. 3 shows a schematic sectional view of a first embodiment according to the invention.

A camera 9 which interacts with an optical system 17 is provided in the embodiment shown in FIG. 3. The camera 9 together with the optical system 17 is fixedly arranged in a cavity 16 of the washing compartment door 6. In this case, the cavity 16 is produced by the spaced-apart arrangement of the outer door panel 14 and the inner door panel 15.

The inner door panel has an aperture 18 through which a visual detection of the washing compartment 4 by means of the camera 9 can take place in accordance with the arrow 23. The aperture 18 is closed in a fluid-tight manner by means of a cover designed as a disk.

The camera 9 interacts with an optical device in the form of a mirror 20. The latter is arranged pivotably about a pivot point 21. A drive 22, which may be, for example, an electric motor or a thermocouple, is used to initiate a rotational movement of the mirror 20.

As the illustration in FIG. 3 shows, the viewing angle of the camera 9, i.e., the area of the washing compartment 4 detected by the camera, can be adjusted by rotating the mirror 20.

Figure 4:
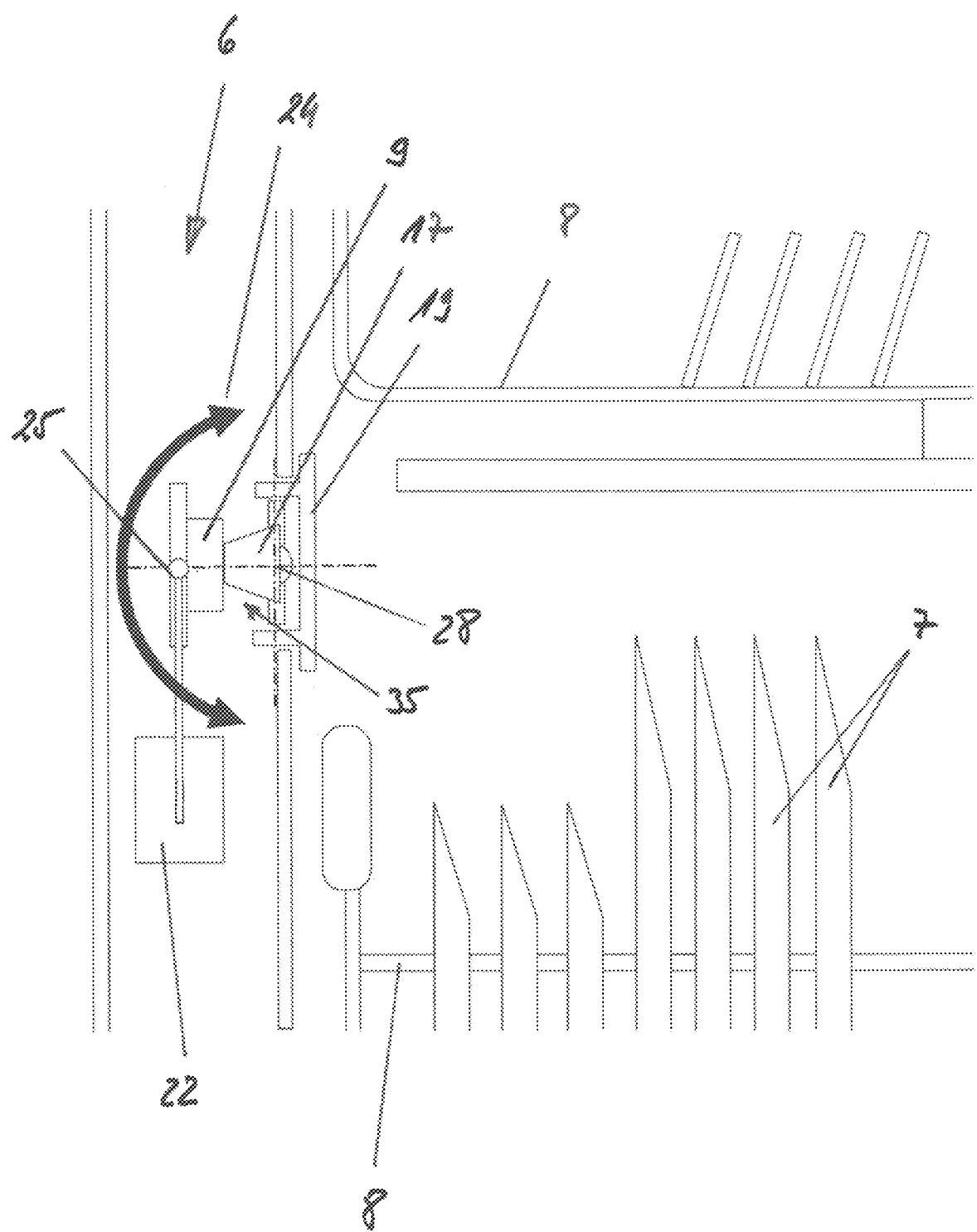
FIG. 4 shows a schematic sectional view of a second embodiment according to the invention.

FIG. 4 shows a second embodiment. The camera 9 itself is designed to be movable in this embodiment. For this purpose, a drive 22 is provided which acts on the camera 9, wherein the camera 9 can execute a pivoting movement about the pivot point 28 in accordance with the arrow 24. The pivot point 28 is located in the area of the optical system 17 interacting with the camera 9, with the result that the articulation point 25 and the pivot point 28 are spaced apart from one another with the interposition of a lever arm. FIGS. 5 and 6 show different orientations of the camera 9, wherein the lower basket is detected by the camera 9 in FIG. 5, whereas the upper basket and the cutlery drawer which is located above it are detected in FIG. 6. The camera position according to FIG. 5 results from the position according to FIG. 4 by pivoting the camera 9 in accordance with the arrow 26. However, the position of the camera 9 according to FIG. 6 results from a pivoting of the camera 9 in accordance with the arrow 27.

In the exemplary embodiment according to FIGS. 4 to 7, the camera 9 is formed as part of a camera unit 35. This camera unit 35 provides not only the camera 9 as such but also the optical system 17 interacting therewith. Pivoting of the camera unit 35 thus causes not only a pivoting of the camera 9 but also a pivoting of the optical system 17 interacting therewith.

The camera 9 and the optical system 17 interacting therewith can be accommodated in a common housing, which is not shown in detail in the figures for the sake of clarity. In the embodiment according to FIG. 8, the camera unit 35 can furthermore comprise lighting means 34 in the form of LEDs, for example. Pivoting of the camera unit 35 consequently leads to a common pivoting of the camera 9, optical system 17, and the associated lighting means 34.

Figure 7:
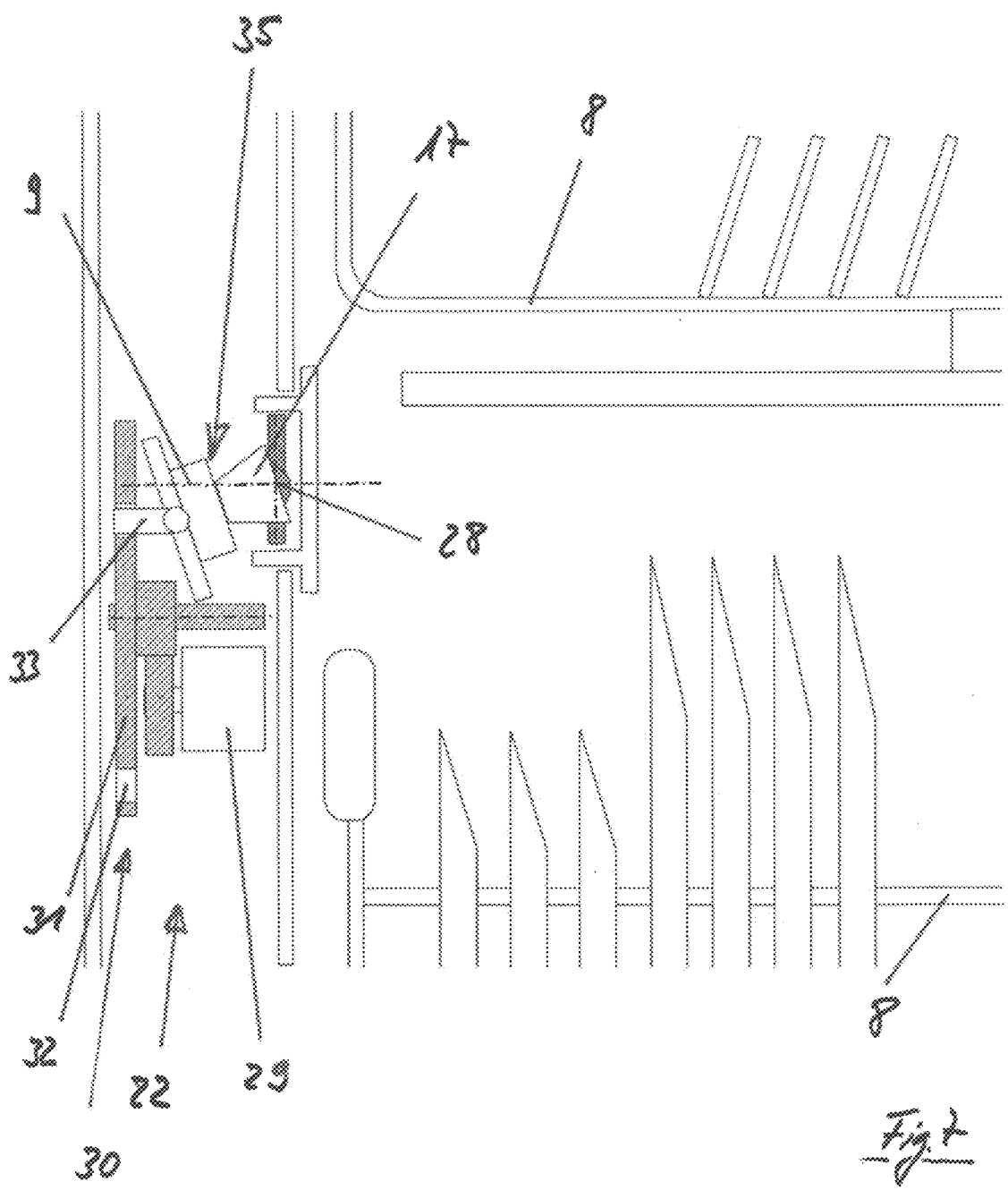
FIG. 7 shows a schematic sectional view of a fourth embodiment according to the invention.
Figure 8:
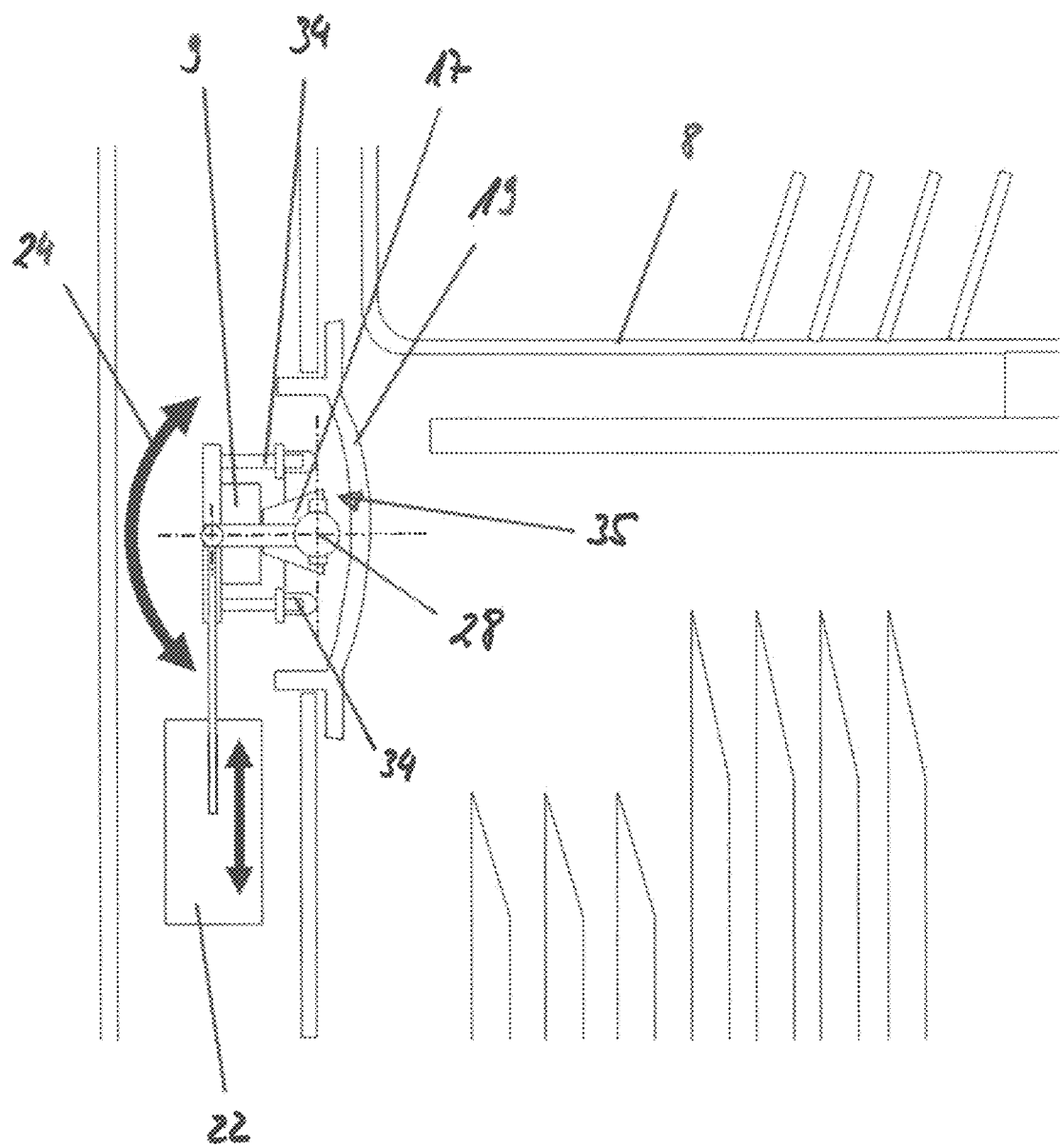
FIG. 8 shows a schematic sectional view of a fifth embodiment according to the invention.

In the embodiment according to FIG. 7, a drive 22 is provided which has an electric motor 29. The latter is operatively connected to a transmission 30, which has a rotary disk 31. The rotary disk 31 has a circumferential groove 32 in which a guide pin coupled to the camera unit 35 engages. In the event of a rotational movement of the rotary disk 31 caused by the electric motor 29, a corresponding movement of the guide pin 33 guided in the circumferential groove results, which in turn leads to a corresponding pivoting movement of the camera unit 35.

FIGS. 9 and 10 show a pivot device 36 for accommodating a camera unit 35, which is arranged, for example, in the cavity 16 of the washing compartment door 6.

The pivot device 36 has a pivot part 40 on the one hand and a rotary part 39 on the other hand. By means of two drives 22, the rotary part 39 can be rotated and the pivot part 40 can be pivoted. In this case, a rotational movement of the rotary part 39 takes place about the rotational axis 38, whereas pivoting of the pivot part 40 takes place about the rotational or pivot axis 37. In the superimposition of these two rotating or pivoting movements, the camera unit 35 accommodated by the pivot part 40 can be moved in such a way that the entire washing container interior can be detected visually.

FIGS. 11 and 12 each show the pivot device 36 in a side view, wherein FIG. 11 shows the connection of the pivot device 36 to the inner door panel 15 of the washing compartment door 6. On the washing compartment side, the corresponding aperture provided in the inner door panel 15 is covered in a fluid-tight manner by means of a transparent disk 19.

Figure 13:
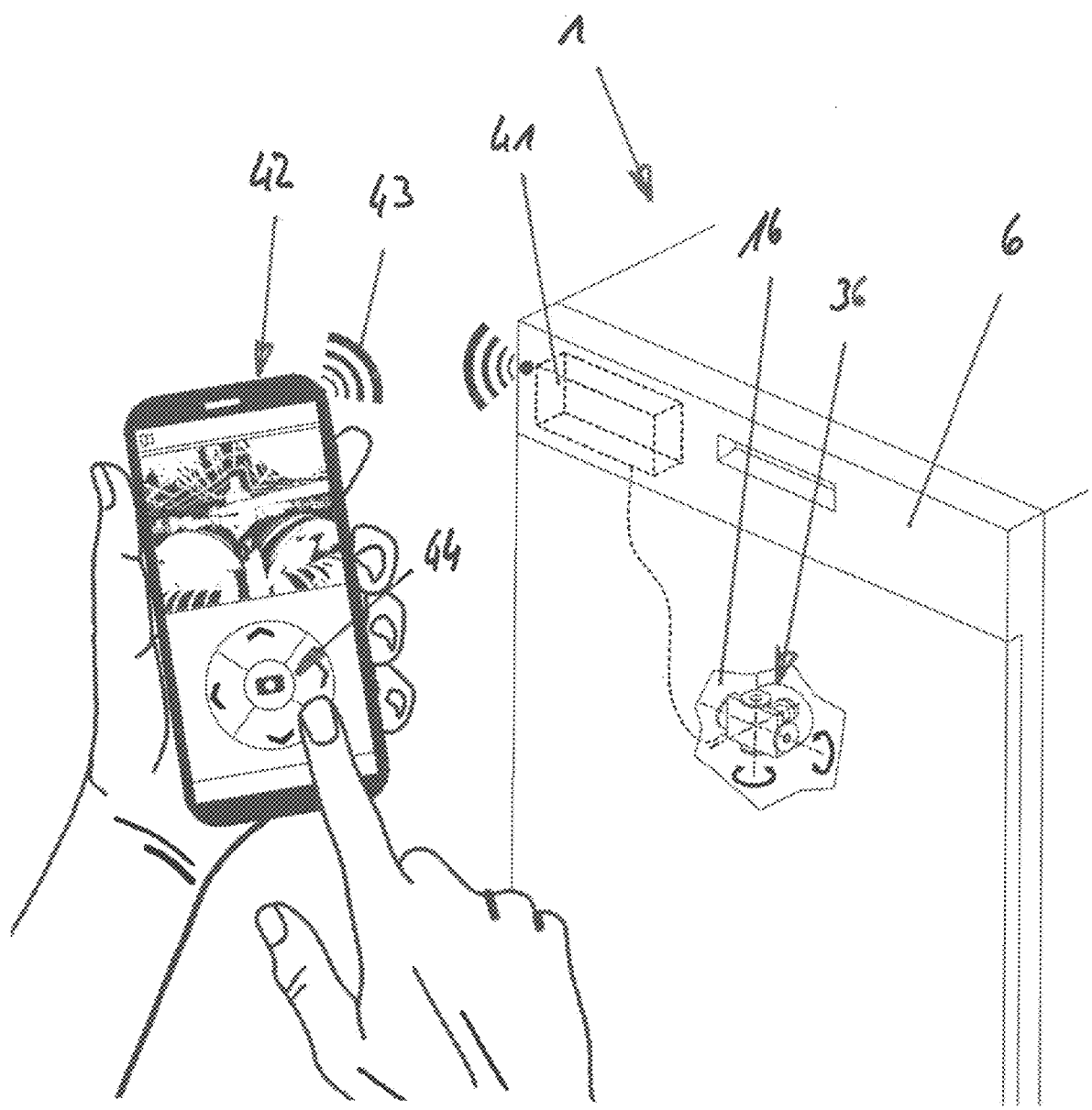
FIG. 13 shows a schematic view of a first use according to the invention.

In the exemplary embodiment according to FIG. 13, remote control of the pivot device 36 can take place. For this purpose, a dishwasher-side operating and control unit 41 and a mobile receiving device 42 are provided, wherein the receiving device 42 is to be operated by a user of the dishwasher 1. The mobile receiving device 42 communicates with the dishwasher-side operating and control unit 41 via a radio connection 43. The connection of the pivot device 36 to the operating and control unit 41 is preferably cable-based but can also be formed by means of a radio connection. However, it is also possible for the pivot device 36 to be connected directly to the mobile receiving device 42 via a radio connection.

By means of the mobile receiving device 42, the image captured by the camera unit 35 can be displayed and a remote control of the pivot device 36 can be carried out, for example by means of corresponding arrow symbols 44 provided by the mobile receiving device 42.

Figure 14:
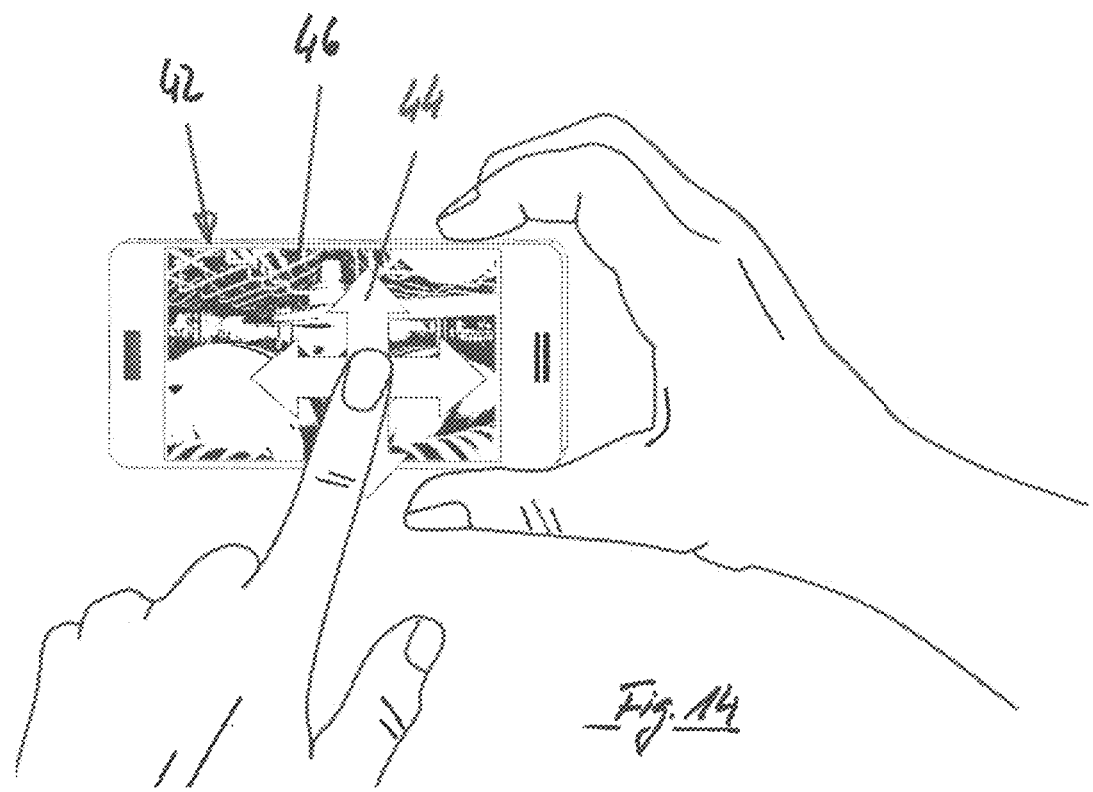
FIG. 14 shows a schematic view of a second use according to the invention.
Figure 15:
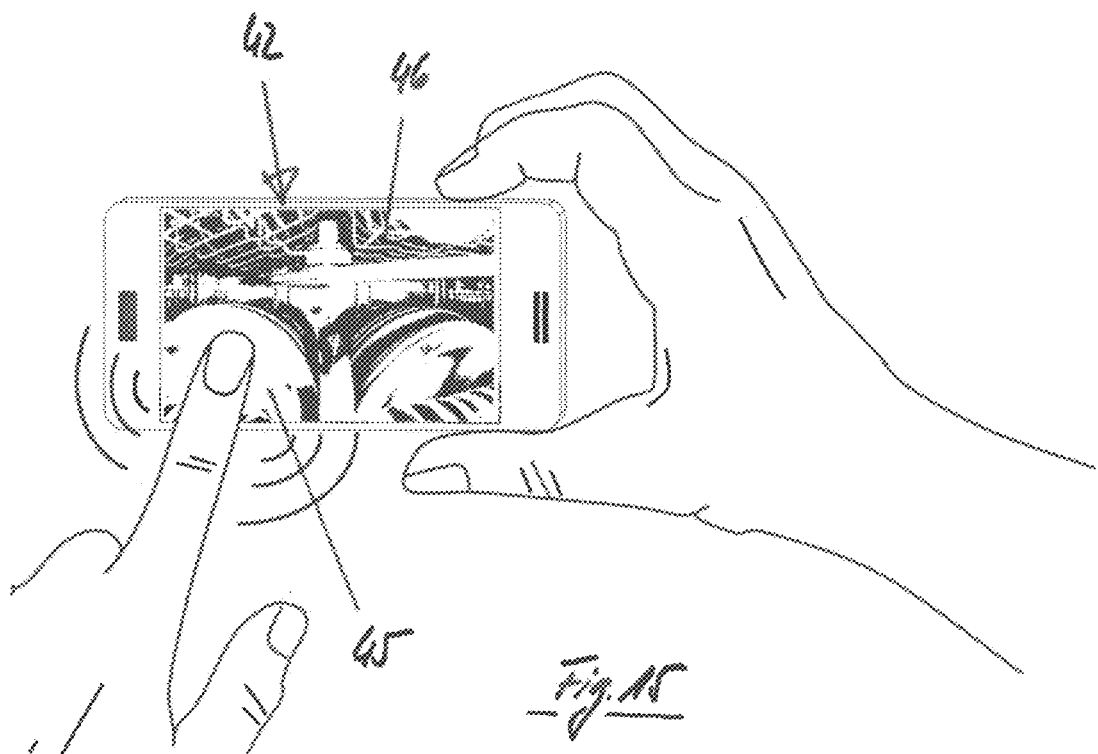
FIG. 15 shows a schematic view of a third use according to the invention.

FIGS. 14 and 15 show further applications. FIG. 14 shows an application of how a control of the pivot device 36 can be carried out in the image 46 represented by the mobile receiving device 42 by corresponding swiping motion according to the arrow symbol 44. In the application shown in FIG. 15, the pivot device 36 is pivoted in that an individual observation point 45 is selected by a user on the image 46 represented by the mobile receiving device 42. The pivot device 36 then pivots the camera unit 35 on this observation point 45.

Figure 16:
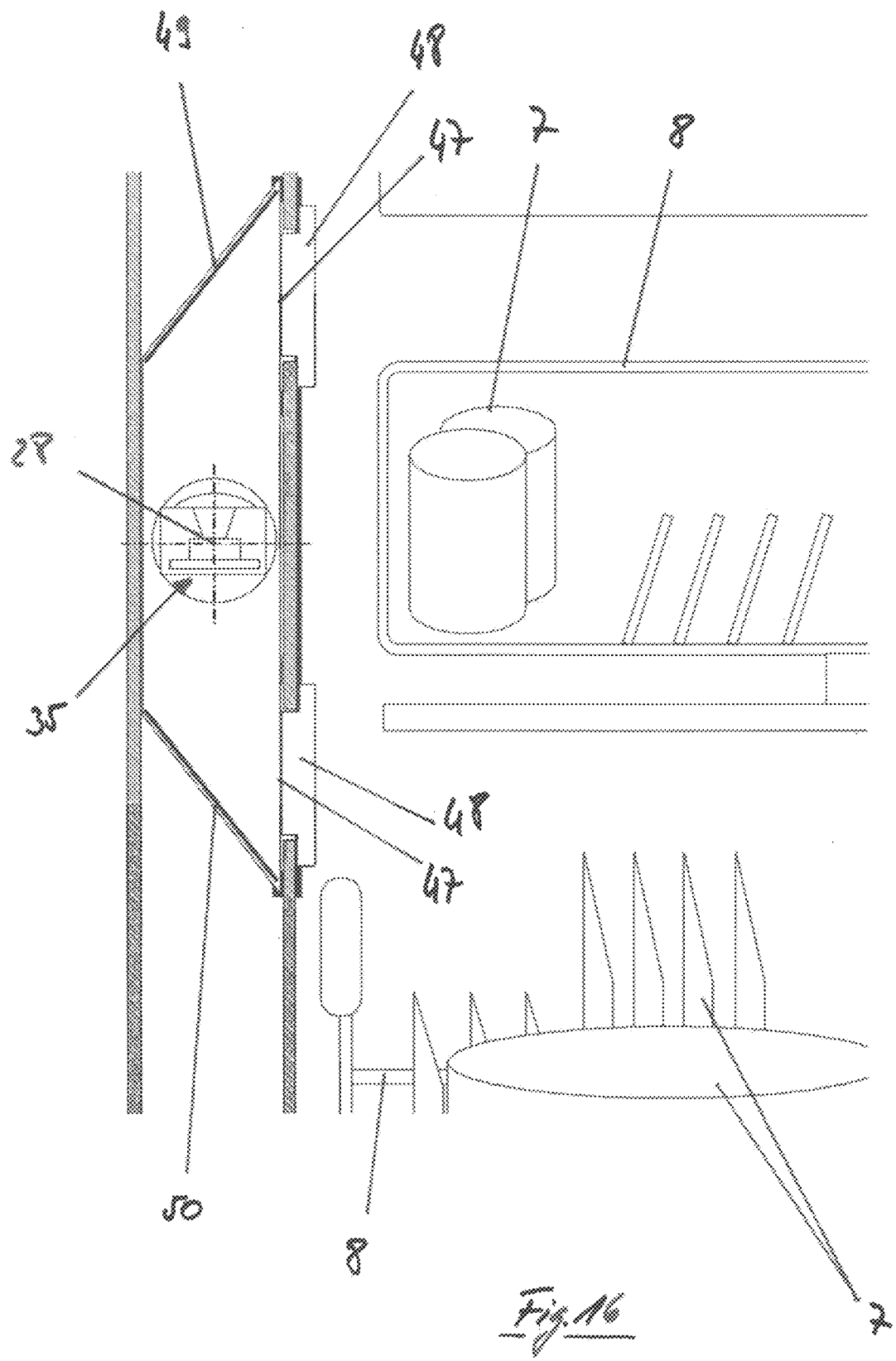
FIG. 16 shows a schematic sectional view of a sixth embodiment of the invention.

FIG. 16 shows another embodiment. A camera unit 35 which interacts with two mirrors 49 and 50 is provided in this embodiment. Each mirror 49 or 50 is provided with an aperture 47 in the inner door panel 15, wherein both apertures 47 are each closed in a fluid-tight manner by means of a respective disk 48. The camera unit 35 is arranged rotatably about a pivot point 38 and, depending on the position, interacts either with the one mirror 49 or with the other mirror 50. In interaction with the mirror 49, as shown in FIG. 16, the washing compartment 4 is detected through the upper aperture 47 in the height direction according to FIG. 16, which permits a visual detection of the cutlery drawer and the upper basket. The lower basket and the upper basket can be reached through the lower aperture 47 in the height direction, for which purpose the camera unit 35 is to be rotated by 180° so that interaction with the mirror 50 can take place.

Figure 17:
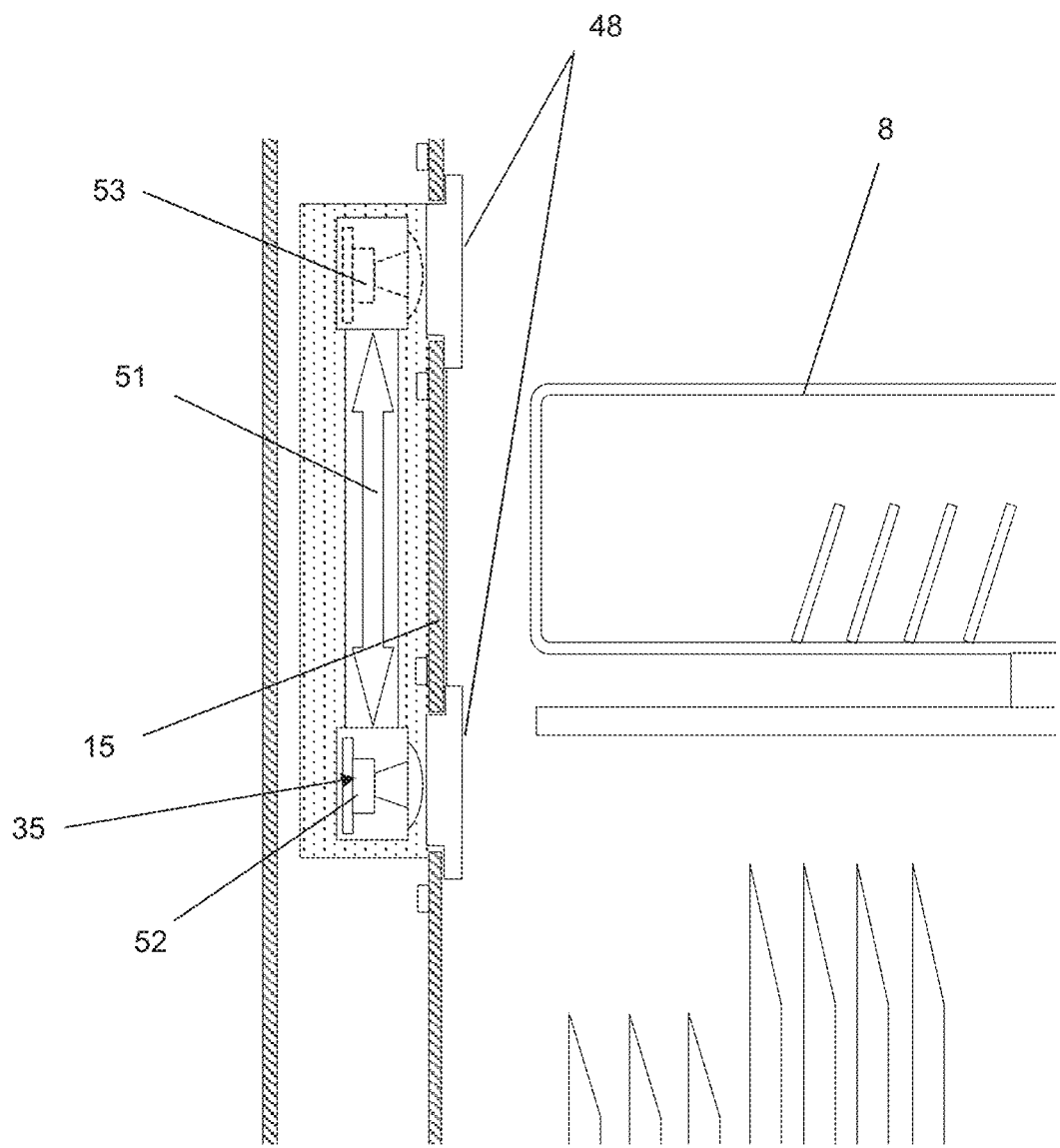
FIG. 17 shows a schematic sectional view of a seventh embodiment of the invention.

In another variant, which is illustrated in FIG. 17, the camera unit 35 can be moved translationally in accordance with the arrow 51, wherein the camera unit 35 can assume a lower position 52 and an upper position 53. In the respective position, the camera unit 35 interacts with a corresponding aperture in the inner door panel 15. In the exemplary embodiment shown, a disk 48 is provided in each case for covering the apertures, but a common disk may also be provided.

Figure 18:
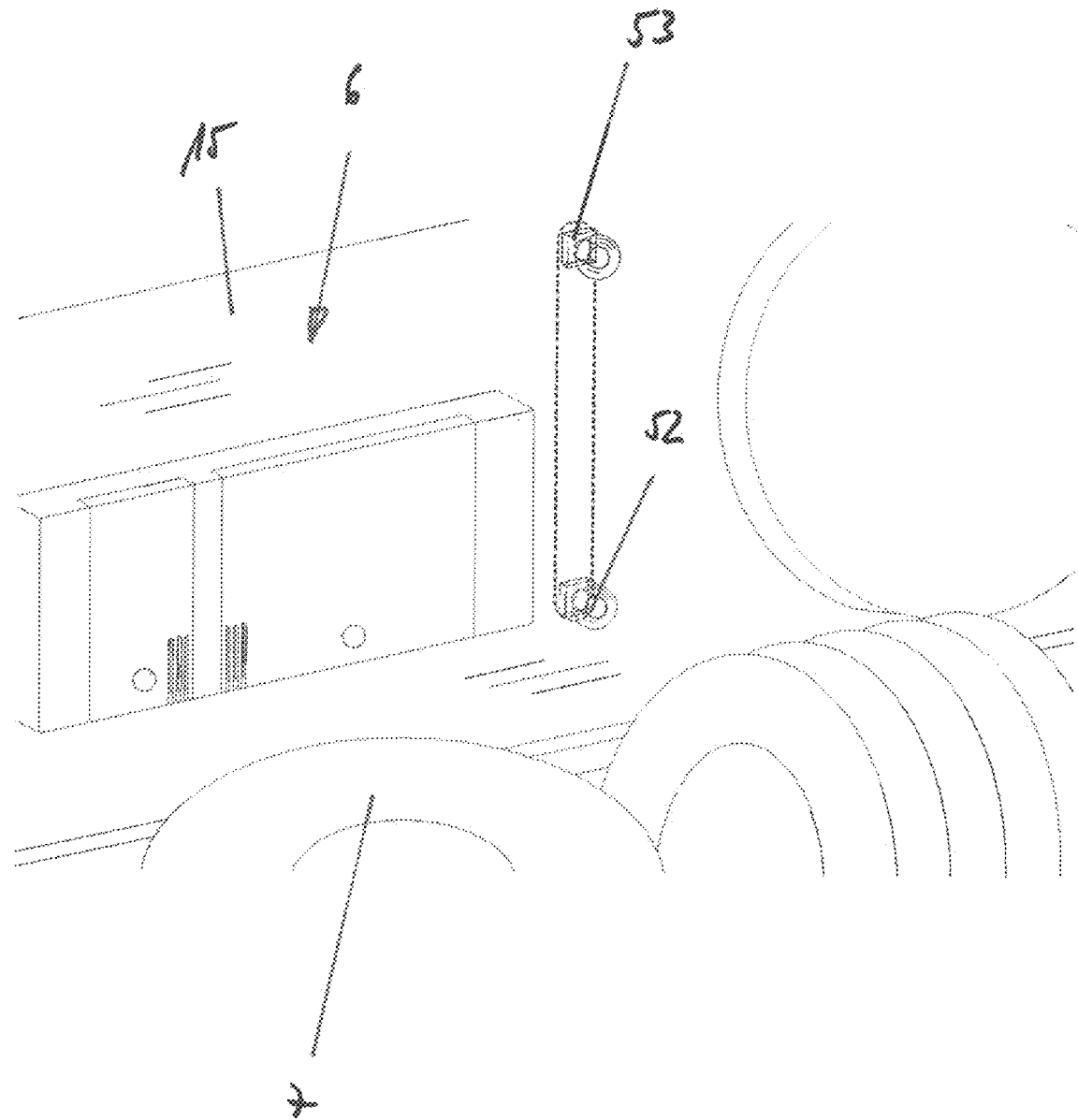
FIG. 18 shows a schematic top view of the embodiment according to FIG. 17.

FIG. 18 shows the embodiment according to FIG. 17 from the direction of the washing compartment 4, wherein the lower position 52 of the camera unit 35 and the upper position 53 of the camera unit 35 can be seen. In this connection, a slit-shaped aperture design would also be conceivable so that the camera 35 can also assume intermediate positions between the lower position 52 and the upper position 53.

Figure 19:
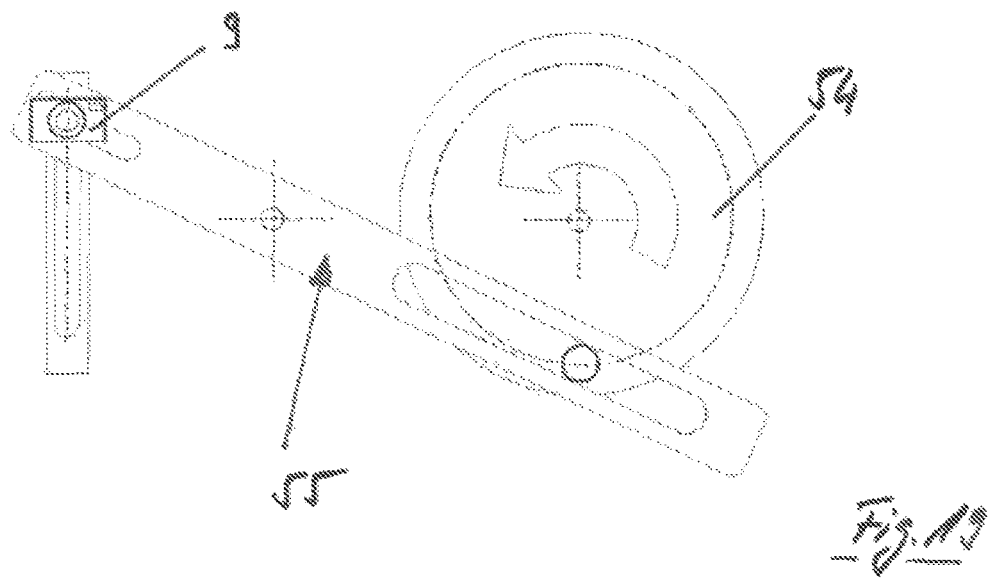
FIG. 19 shows a schematic view of the functionality of the embodiment according to FIG. 17 in accordance with a first position.
Figure 20:
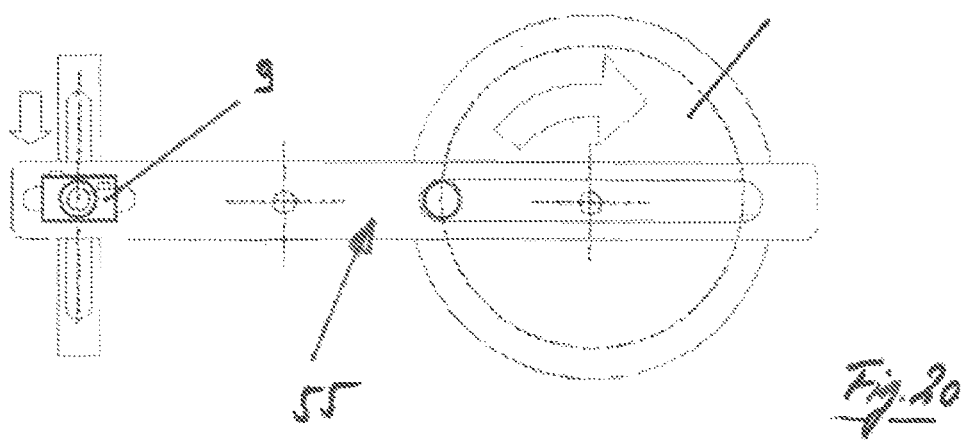
FIG. 20 shows a schematic view of the functionality of the embodiment according to FIG. 17 in accordance with a second position.
Figure 21:
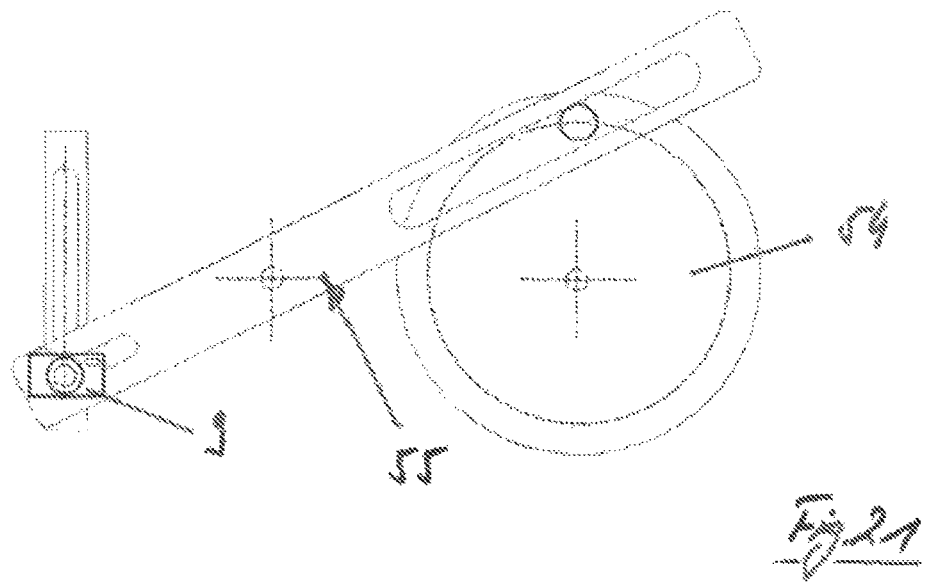
FIG. 21 shows a schematic view of the functionality of the embodiment according to FIG. 17 in accordance with a third position.

For translational movement of the camera unit 35, an arrangement can be provided as shown in different positions in FIGS. 19 to 21. In this particular embodiment, an operative connection between the camera 9 and a rotatable reservoir 54 provided anyway by the dishwasher 1 is provided with the interposition of a transmission 55. This embodiment does not require a separate drive for moving the camera 9.

The reservoir 54 accommodates detergent, wherein it is provided for discharging detergent that the reservoir 54 rotates by means of an electric drive provided for this purpose. This device of the dishwasher 1, which is provided anyway, is used in the exemplary embodiment according to FIGS. 19 to 21 to also cause a movement of the camera 9. For this purpose, a transmission 55 in the form of a thrust crank drive is provided, which converts the rotational movement of the reservoir 54 into a translational movement of the camera 9. As a result, a movement of the camera 9 can thus be achieved by a rotational movement of the reservoir 54, as illustrated in FIGS. 19 to 21 by way of example on the basis of three possible camera positions.

The camera 9 or the camera unit 35 can be used for loading detection and/or dirt detection. It can also be used to transmit an image from the washing compartment to a cross-linked, in particular mobile, end device. For example, a customer service can view the washing compartment during an intended use of the dishwasher and check for the proper function of the spraying device, for example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| Reference signs | |
|---|---|
| 1 | Dishwasher |
| 2 | Housing |
| 3 | Treatment container, washing container |
| 4 | Treatment compartment, washing compartment |
| 5 | Loading opening |
| 6 | Treatment compartment door, washing compartment door |
| 7 | Items to be treated, items to be washed |
| 8 | Treatment racks, washing racks |
| 9 | Camera |
| 10 | Detection area of camera |
| 11 | Detection area of camera |
| 12 | Detection area of camera |
| 13 | Detection area of camera |
| 14 | Outer door panel |
| 15 | Inner door panel |
| 16 | Cavity |

-continued

| Reference signs | |
|---|---|
| 17 | Optical system |
| 18 | Aperture |
| 19 | Disk |
| 20 | Mirror |
| 21 | Pivot point |
| 22 | Drive |
| 23 | Arrow |
| 24 | Arrow |
| 25 | Articulation point |
| 26 | Arrow |
| 27 | Arrow |
| 28 | Pivot point |
| 29 | Electric motor |
| 30 | Transmission |
| 31 | Rotary disk |
| 32 | Circumferential groove |
| 33 | Guide pin |
| 34 | Lighting means |
| 35 | Camera unit |
| 36 | Pivot device |
| 37 | Rotational axis |
| 38 | Rotational axis |
| 39 | Rotary part |
| 40 | Pivot part |
| 41 | Operating and control unit |
| 42 | Mobile receiving device |
| 43 | Radio connection |
| 44 | Arrow symbol |
| 45 | Observation point |
| 46 | Image of washing compartment |
| 47 | Aperture |
| 48 | Disk |
| 49 | Mirror |
| 50 | Mirror |
| 51 | Arrow |
| 52 | Lower position |
| 53 | Upper position |
| 54 | Reservoir |
| 55 | Transmission |

The invention claimed is:

1. A household appliance, comprising:
a treatment container comprising a treatment compartment and a loading opening for loading items to be treated;
a treatment compartment door by which the loading opening is closeable, the treatment compartment door having an outer door panel, an inner door panel, and a cavity arranged therebetween, the inner door panel having an aperture closed in a fluid-tight manner by a cover; and
a camera configured to visually detect the treatment compartment,
wherein an area of the treatment compartment detectable by the camera is adjustable,
wherein the camera is mounted so as to be displaceable and/or pivotable within the cavity, and/or the camera being part of a camera unit and mounted so as to be displaceable and/or pivotable within the cavity, and/or the household appliance further comprises an optical system configured to interact with the camera or a camera unit that includes the camera, the optical system being mounted so as to be displaceable and/or pivotable within the cavity,
wherein the treatment compartment is visually detectable through the aperture by the camera or a camera unit that includes the camera, and
wherein the household appliance further comprises a drive for the camera, the camera unit, and/or the optical system.

2. The household appliance of claim 1, wherein the camera is part of a camera unit and mounted so as to be displaceable and/or pivotable within the cavity, and/or the household appliance further comprises an optical system configured to interact with the camera or a camera unit that includes the camera, the optical system being mounted so as to be displaceable and/or pivotable within the cavity, and
wherein the camera unit has a housing in which the camera is arranged.

3. The household appliance of claim 1, wherein the household appliance further comprises an optical system configured to interact with the camera or a camera unit that includes the camera, the optical system being mounted so as to be displaceable and/or pivotable within the cavity, and
wherein the optical system provides a reflective surface.

4. The household appliance of claim 1, further comprising:
a pivot device configured to carry the camera or the camera unit and by which the camera or the camera unit is pivotable about two perpendicular rotational axes.

5. The household appliance of claim 4, wherein a displacement and/or pivoting movement of the camera or of the camera unit is remotely controllable.

6. The household appliance of claim 1, further comprising:
a closure element configured to transfer between a closed position covering the camera or the camera unit, and a use position exposing the camera or the camera unit.

7. The household appliance of claim 6, further comprising:
transferring means configured to cause the closure element to be transferred between the closed position and the use position as a function of a position of the treatment compartment door.

8. The household appliance of claim 1, wherein the drive comprises a thermocouple and/or an electric motor.

9. A household appliance, comprising:
a treatment container comprising a treatment compartment and a loading opening for loading items to be treated;
a treatment compartment door by which the loading opening is closeable; and
a camera configured to visually detect the treatment compartment,
wherein an area of the treatment compartment detectable by the camera is adjustable,
wherein the camera is part of a camera unit,
wherein the camera unit is mounted so as to be displaceable and/or pivotable, and
wherein the household appliance further comprises a closure element configured to transfer between a closed position covering the camera or the camera unit and a use position exposing the camera or the camera unit.

10. The household appliance of claim 9, further comprising:
transferring means configured to cause the closure element to be transferred between the closed position and the use position as a function of a position of the treatment compartment door.

11. A household appliance, comprising:
a treatment container comprising a treatment compartment and a loading opening for loading items to be treated;
a treatment compartment door by which the loading opening is closeable, the treatment compartment door having an outer door panel, an inner door panel, and a cavity arranged therebetween, the inner door panel having an aperture closed in a fluid-tight manner by a cover; and a camera configured to visually detect the treatment compartment, wherein an area of the treatment compartment detectable by the camera is adjustable, wherein the camera is mounted so as to be displaceable and/or pivotable within the cavity, and/or the camera being part of a camera unit and mounted so as to be displaceable and/or pivotable within the cavity, and/or the household appliance further comprises an optical system configured to interact with the camera or a camera unit that includes the camera, the optical system being mounted so as to be displaceable and/or pivotable within the cavity, wherein the treatment compartment is visually detectable through the aperture by the camera or a camera unit that includes the camera, and wherein the household appliance further comprises a pivot device configured to carry the camera or the camera unit and by which the camera or the camera unit is pivotable about two perpendicular rotational axes.

12. The household appliance of claim 11, wherein a displacement and/or pivoting movement of the camera or of the camera unit is remotely controllable.

* * * * *